April 24, 1956  M. COHEN  2,742,869
TRAVELING HEARTH OVEN CONVEYOR
Filed May 15, 1951
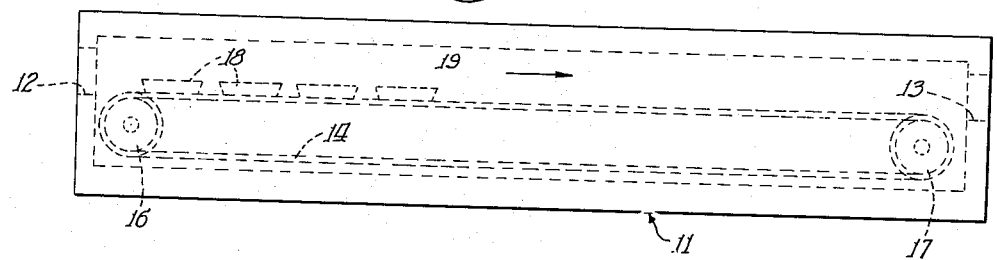
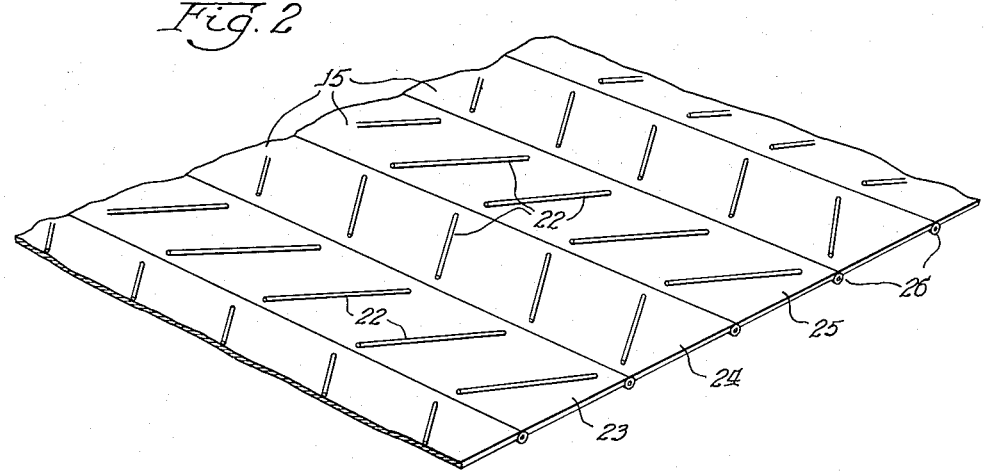
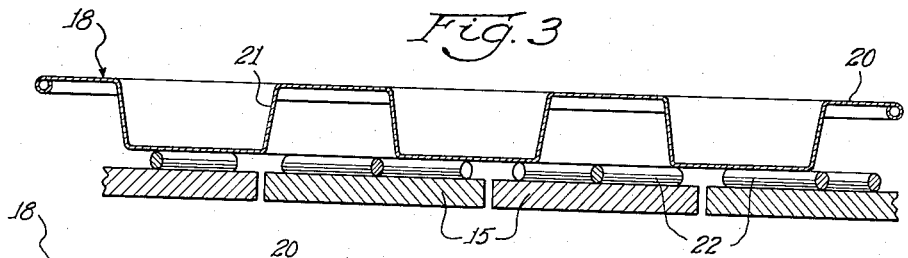
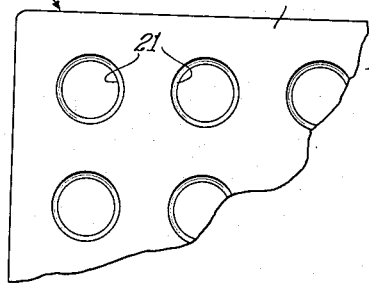
Inventor:
Morris Cohen
By: Jones, Tesch & Darbo
Attys.

United States Patent Office 2,742,869
Patented Apr. 24, 1956

2,742,869
TRAVELING HEARTH OVEN CONVEYOR

Morris Cohen, Kansas City, Mo., assignor to Interstate Bakeries Corporation, Kansas City, Mo., a corporation of Delaware Application May 15, 1951, Serial No. 226,417

1 Claim. (Cl. 107—57)

This invention relates to traveling hearth ovens commonly used by commercial bakeries for the baking of bread or rolls in quantities, and the invention is directed to improvements therein.

It has been commonly known to construct ovens of the class here referred to with the hearth thereof in the form of a conveyor for the goods to be baked, the conveyor being made up of a plurality of solid steel plates hinged or otherwise articulated to form an endless movable conveyor element, the pans containing the bread or rolls being placed on the plates on the upper run of the conveyor and being thereby carried through the length of the oven, during which the baking step takes place. These pans for bread or rolls are commonly uneven on the bottom due to the relative thinness of the metal of the pan and its continued subjection alternately to heating and cooling. As a result of such unevenness, parts of the pan bottom will touch the hearth plate directly and other parts adjacent thereto will be spaced somewhat from the plate. This causes a greater heat transfer from the hearth to the pan bottom at the point where direct contact is made than at points where direct contact does not occur. This results in objectionable non-uniform baking on the bottom of the loaf or roll and frequently causes burnt spots which adversely affect the saleability of the bakery product.

In an attempt to remedy this condition, buttons or projections have sometimes been formed on the pan bottom, but this requires special pans, which are expensive, particularly since they require frequent replacement. Furthermore, the location of the button or projection is fixed with respect to the pan, with attendant disadvantages later herein suggested.

The present invention aims to avoid the disadvantages of earlier attempted remedies and provides means associated with the oven itself for spacing the pan from direct contact with the hearth plate, and which, at the same time, is relatively inexpensive, and maintains the efficiency of the oven unimpaired.

These and other objects and advantages will be apparent from the following description, taken together with the accompanying drawing, of an illustrative embodiment of the invention, and in which drawing—

Figure 1 is a somewhat diagrammatic longitudinal sectional view of a so-called traveling hearth oven to which the present invention may be applied;

Figure 2 is a fragmentary enlarged perspective view of a plurality of the articulated plates making up the movable conveyor hearth and to which the invention has been applied;

Figure 3 is a still further enlarged fragmentary sectional view of one of the illustrative pans for rolls supported on the hearth plates through the intermediation of protuberances on the plates following the present invention; and Figure 4 is a fragmentary plan view of one of the illustrative pans here shown in Fig. 3.

Referring in detail to the illustrative construction shown in the drawing, the numeral 11 may indicate the oven itself having doors 12 and 13 at opposite ends through which pans containing the articles to be baked are respectively entered into and removed from the oven. Following conventional construction, the oven may have the traveling conveyor 14, composed of an endless series of articulated hearth plates 15, which pass over and around the driving drums 16 and 17 at opposite ends of the oven. Suitable means are provided, not here shown, for rotating the drums and moving the hearth.

A plurality of pans 18 are indicated as having been placed on the upper run of the conveyor 14 through the door 12 for movement through the oven in the direction of the arrow 19 and to be subsequently removed through the door 13 as a given pan reaches the end of the travel of the upper run of the conveyor, the interval of time for such travel being such that the bakery products carried in the pan are suitably subjected to the heat of the oven for suitable baking, it being here unnecessary to show the heating means, which it will be understood raises the temperature of the inside of the oven appropriately for the purpose while at the same time heating the hearth plates 15.

The pans 18 may be of any suitable construction or form, and, in this instance, as best seen in Figs. 3 and 4, are such as are suitable for the baking of so called rolls for example, in which form the pan has an upper member 20 and a series of spaced apart depressions 21, each to receive a suitable quantity of prepared dough for an individual roll.

Turning now to the improvements to which the present invention is more particularly directed, I have provided a plurality of spaced apart protuberances 22 secured on the faces of the hearth plates 15. In this instance, the protuberances 22 are conveniently provided by sections of three-sixteenths inch diameter rods welded to the plate faces, the rods being arranged say approximately six inches apart on a given plate, which latter is about six feet long and about eight inches wide, the length of the plate being referred to in a direction transversely of the oven. The length of each rod section is desirably somewhat less than the width of the plate and say about six inches. The small diameter of the rods desirably provides a relatively low protuberance.

As clearly shown in Fig. 2, the rods 22 are preferably staggered on adjoining plates, in that the rods on the plate 23, for example, extend obliquely in one direction, while the rods 22 on the adjoining plate 24 obliquely in the reverse or opposite direction, and the rods 22 on the next plate 25 are again reversed in an oblique direction, to be parallel with the rods on the plate 23, and so on, throughout the entire length of the endless plate hearth conveyor. It will be understood that the plates 15 are suitably articulated to form the endless flexible band indicated as by hinge means illustrated at 26, which may include the usual hinge pins and hinge knuckles as is well known in the art.

Other protuberant forming means might be employed in substitution for the rod sections and to be distributed over substantially the entire area of the plate but covering substantially less than all of the area of a given plate as here exemplified.

When now a pan 18 is placed in the oven, the pan will rest on the rods 22 (making relatively small contact therewith) instead of on the hearth plate directly, thus avoiding direct contact of the pan bottom with the hot plate and permitting air circulation between the plate and the pan bottom.

This arrangement not only desirably prevents burnt spots on the underside of the rolls or other bakery product, but also guards against excessive browning of the underside of the roll, without the expensive provision of forming buttons or projections on the bottom of the pan. Furthermore, since the protuberance is on the hearth plate and not on the pan bottom, the location of the protuberance with respect to the pan bottom does not remain absolutely fixed as in the case of the button on the pan bottom.

As shown in the drawing, the rod-like protuberances 22 are spaced apart transversely of the conveyor approximately the center to center distance of the spacing of the depressed formations 21 of the pan, and as shown in Fig. 3, each depressed formation contacts at least one of said protuberances in successive rows including depressions of the pan and protuberances on the conveyor plates. It will thus be understood that a baking pan 18 may rest on the rods 22 of the conveyor through the intermediation of the depressed formations 21.

I have thus provided inexpensive and improved means for accomplishing the purpose described, and such changes may be made therein, without departing from the invention, as fall within the scope of the appended claimed subject-matter.

The invention having been described, what is here claimed is:

In a traveling hearth oven conveyor having articulated laterally elongated plates which are substantially narrower in the direction of their movement than in the direction of their lateral elongation, that improvement, for use with a baking pan embodying rows of aligned spaced apart depressed formations, comprising, a plurality of elongated narrow metallic protuberances on each conveyor plate extending obliquely of the plate and laterally spaced apart thereon, said protuberances being spaced apart transversely of the conveyor approximately the center to center distance of a pair of adjoining depressed formations of said pan, each depressed formation contacting at least one of said protuberances in successive rows of depressions of the pan and protuberances on the conveyor plates, the protuberances on one plate being arranged in the opposite oblique direction with respect to the protuberances of an adjoining plate, whereby the protuberances on alternate plates extend in substantially the same oblique direction and protuberances on adjoining plates extend in opposite oblique directions, whereby by reason of said spacing the pan may shift on the conveyor without losing contact of a depression with a protuberance, while minimizing the area of such contact.

References Cited in the file of this patent

UNITED STATES PATENTS

| | | |
|---|---|---|
| 273,004 | Anderson | Feb. 27, 1883 |
| 1,414,212 | Samuelson | Apr. 25, 1922 |
| 1,817,212 | Mattison | Aug. 4, 1931 |
| 2,045,957 | Loose | June 30, 1936 |
| 2,262,172 | Engels et al. | Nov. 11, 1941 |
| 2,262,692 | Meacham | Nov. 11, 1941 |